United States Patent [19]
Turner

[11] 3,882,552
[45] May 13, 1975

[54] SELF-CONTAINED WASTE TREATMENT SYSTEM

[75] Inventor: Abner B. Turner, Greensburg, Pa.

[73] Assignee: Westinghouse Electric Corporation, Pittsburgh, Pa.

[22] Filed: May 2, 1973

[21] Appl. No.: 356,670

[52] U.S. Cl. ............................. 4/10; 4/80; 4/115; 4/131; 110/9 R; 210/167
[51] Int. Cl. . E03d 5/014; E03d 5/016; A47k 11/02
[58] Field of Search .............. 4/10, 17, 77, 78, 111, 4/115, 118, 131, DIG. 3, DIG. 4, 76, 79, 80, 83, DIG. 12; 110/9 E, 8 R, 9 R; 210/152, 167

[56] References Cited
UNITED STATES PATENTS

| | | | |
|---|---|---|---|
| 1,303,358 | 5/1919 | Montgomery | 4/115 |
| 3,054,117 | 9/1962 | Cella | 4/115 |
| 3,098,144 | 7/1963 | Dale | 4/131 |
| 3,436,765 | 4/1969 | Sundberg | 4/131 |
| 3,474,468 | 10/1969 | Blankenship | 4/131 |
| 3,522,613 | 8/1970 | Botsford | 4/111 |
| 3,655,048 | 4/1972 | Pergola | 210/152 |
| 3,673,614 | 7/1972 | Claunch | 4/10 |
| 3,694,825 | 10/1972 | Kufrin et al. | 4/131 |
| 3,734,852 | 5/1973 | Borden | 4/115 X |
| 3,752,090 | 8/1973 | Frankel | 4/131 |
| 3,776,152 | 12/1973 | Gill | 4/131 X |

*Primary Examiner*—John W. Huckert
*Assistant Examiner*—Stuart S. Levy
*Attorney, Agent, or Firm*—J. R. Campbell

[57] ABSTRACT

A waste treatment system especially designed for use on a marine vessel or land based vehicle which includes a housing enclosing a bowl having a valve which closes an opening in the bottom thereof. Upon actuation of the valve to an open position, solid and liquid waste materials are discharged onto an endless coil spring belt, the arrangement being such that the liquid falls through the spring openings into a sump while the solid waste products are discharged from an end of the rotating belt into an incinerator for eventual destruction by burning. To provide a flushing liquid for the bowl, liquid from the sump is pumped through a filter which removes any solid particulate matter in the liquid and is discharged therefrom to a chlorinator which kills bacteria in the liquid prior to discharging it into the bowl. The discharge end of the pump also is connected to a hydraulic device which actuates the valve to discharge waste products from the bowl in accordance with the demands of a timer which is used for controlling pumpmotor operation. A timer also is set to control operation of the incinerator for burning the solid waste products once during each 24 hours period.

8 Claims, 5 Drawing Figures

SELF-CONTAINED WASTE TREATMENT SYSTEM

BACKGROUND OF THE INVENTION

The invention described herein relates to waste treatment systems and more particularly to a compact self-contained treatment system especially adapted for use in marine and land based vehicles.

Each year 150,000 new pleasure boats are added to the estimated 8.6 million already in existence. According to the provisions of the Water Quality Improvement Act of 1970, marine vessels are prohibited from discharging water from the boats' toilets and other facilities into the nation's waters. Also, land based vehicles such as campers and house trailers similarly are prohibited from indiscriminate dumping or otherwise disposing of untreated sewage without first processing the sewage to meet the standards established by the Federal Environmental Protection Agency.

Different designs of water treatment systems have been developed to permit compliance with the Act. In almost all cases, a toilet or head of conventional configuration surmounts or encloses the sewage treatment operating components and the complete unit generally fits within a space about the same size as domestic installations. Disposal of boat waste from garbage disposers, toilets or heads of this type generally is accomplished by simply flushing the wastes to boats holding tanks for later discharge into large containers at a marina or into municipal sewage systems. Other known systems include macerating and chlorinating the waste prior to discharging it into the water, or treating and recirculating waste liquids from a holding tank such as the type used on commercial aircraft, or by burning the waste products in an incinerator.

All of the above identified systems contain serious disadvantages for varying reasons. In the holding tank arrangement, valuable boat space is required for the system components and many marinas are not equipped with facilities sufficient to either process this sewage or discharge it into existing municipal sewage systems.

The macerating and chlorinating system is one in which solid and liquid waste products are flushed from a bowl into a tank wherein the solid products are shredded while the liquid is sterilized by adding a chlorinating ammonium quaternary, such as HYAMINE. Hypochlorite tablets also are widely used for this purpose. This type system often encounters difficulty in properly shredding solid waste products and unless sufficient chlorine is promptly added to the system adequate kill of bacteria is not obtained.

Another system which is in use is a self-contained system charged with a liquid such as water, which is recirculated in the system and primarly functions as a bowl flushing medium. Offensive odors can be generated as decomposition occurs if bacteria destroying chemicals are not promptly added.

In order to obtain public acceptance of the recirculating system, a dye, perfume and biocide usually are added to the liquid, the blue dye serving to mask the color while the perfume masks sewage odors and the biocide serves as a germicidal agent for killing bacteria. The biocide often contains formaldehyde which is more toxic to aquatic life than the sewage itself. Zinc sulfate often is used as a substitute since the harmful metals it adds to the water are not as harmful to aquatic life as the formaldehyde.

The incinerator type utilizes an electrical or gas-fired heater for disposing waste liquids and solids. The incinerator generally is located immediately beneath the head or toilet bowl. It is a dry system which employs a bowl liner of wax or other paper which is burned with the solid waste products in an incinerator while the generated heat evaporates waste liquids. This system represents a substantial departure from conventional liquid flushing systems and bowl cleaning therefore is a problem because of the lack of liquid cleaners. Also, a substantial amount electrical power is required and such power generally is not available on small craft.

BRIEF SUMMARY OF THE INVENTION

Briefly stated, the above problems of the prior art are eliminated by providing a compact self-contained waste treatment system which meets governmental regulations and standards. Solid and liquid waste products introduced into the system are separated from each other by a porous conveyor which delivers the solid waste products to an incinerator for decomposition by burning. The separated liquid is filtered to remove small suspended particles and subsequently treated with a germicidal agent for removing bacteria prior to being pumped or circulated to a toilet or head for bowl flushing purposes. A timing mechanism initiates combustion of solid wastes at predetermined times.

An object of the invention therefore is to provide a closed cycle waste treatment system which consumes solids waste by combustion and purifies liquid for recirculation in the system.

Another object of the invention is to provide a waste treatment system which when installed in a vessel will effectively and efficiently operate over at least one sailing season without the need to drain and replenish liquid in the system.

Still another object of the invention is to provide a waste treatment system which utilizes heat from an incinerator used for burning system solids to evaporate a portion of the liquid in the system and thereby maintain system equilibrium.

DESCRIPTION OF THE DRAWINGS

The subject which I regard as my invention is particularly pointed out and distinctly claimed in the concluding portion of this specification. My invention however both as to organization and method of operation, together with further objects and advantages thereof, may best be understood by reference to the following description taken in connectin with the accompanying drawing wherein:

DESCRIPTION OF THE PREFERRED EMBODIMENTS

Figure 1:
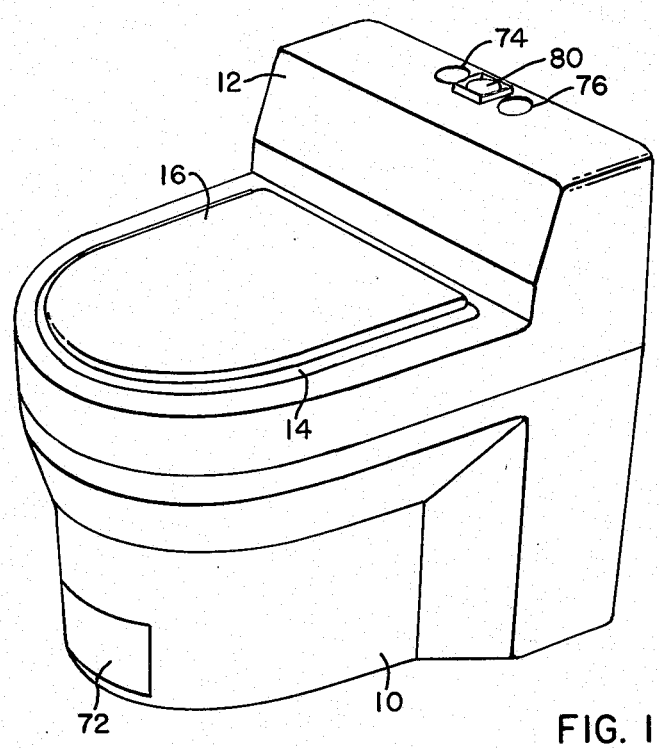
FIG. 1 is an isometric view of apparatus containing a waste treatment especially adapted for installation on a marine vessel or land based vehicle.

Referring now to the drawings wherein like reference characters designate like or corresponding parts throughout the several views, there is shown in FIG. 1 a perspective view of a compact waste treatment system particularly suitable for installation on a vessel or land based vehicle. The system equipment and components occupy the space of a cube approximately 20–24 inches on each side and is constructed of stainless steel, molded plastic or similar material. The head includes a housing 10 and back 12 which houses the operating components and is equipped with a seat 14 having a cover 16. When the head is set in place on a boat, for example, all components are contained within the base and the only outside connection consists of an electrical power lead adapted for connection to the boat, camper or shore electrical power generating equipment, and a vent for the exhaust gases.

Figure 2:
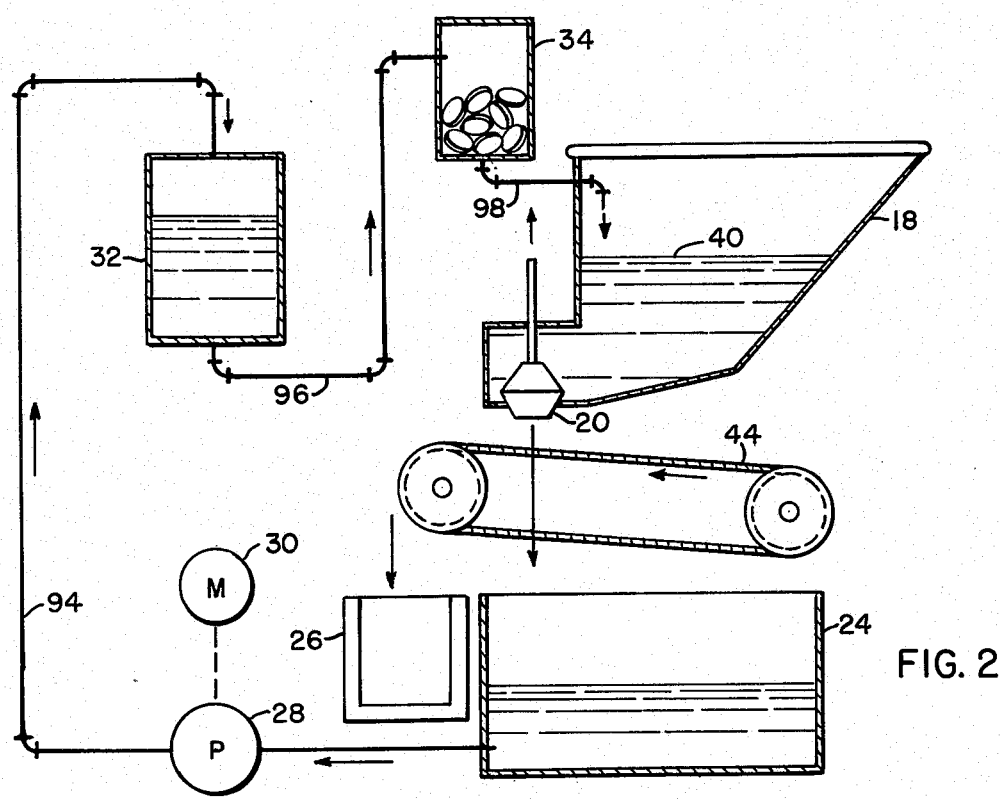
FIG. 2 is a flow diagram of system components used in the apparatus shown in FIG. 1.

FIG. 2 is a flow diagram of the system. The bowl 18 is of a conventional domestic design but is equipped with an automatically operable stop valve 20 which controls the bowl liquid outlet, instead of the usual float-operated type. Solid and liquid wastes are discharged from the bowl 18 onto a screen belt 44 which permits liquid to pass freely therethrough into a sump 24, while solids are supplied to an incinerator 26 for burning. The system is especially designed to purify and recirculate the liquid for bowl flushing purposes and this is accomplished by a pump 28 driven by motor 30 which circulates the liquid to filter 32 to effect removal of minute suspended solids or particulate matter prior to being discharged to a chlorinator 34. The chlorinator contains tablets, preferably calcium hyprochlorite tablets, of the type used in swimming pools, which serve as a germicidal agent to kill bacteria before the liquid is recirculated to the bowl 18 for flushing purposes. System performance shows that the quality of treated liquids circulated through the system surpasses the high standards established by the Environmental Protection Agency and no wastes are discharged to the environment.

Figure 3:
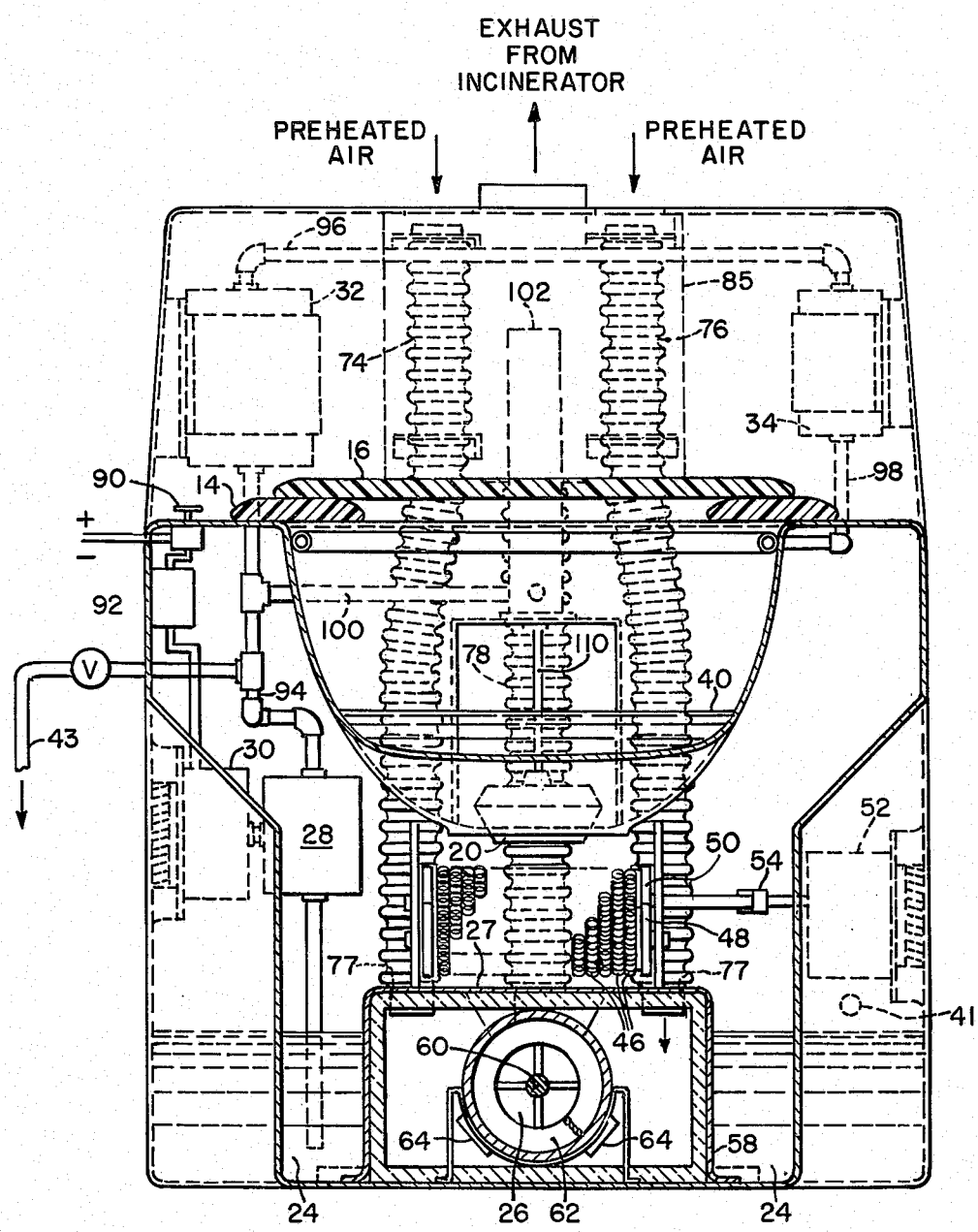
FIG. 3 is a front sectional view in elevation of the apparatus shown in FIG. 1.
Figure 4:
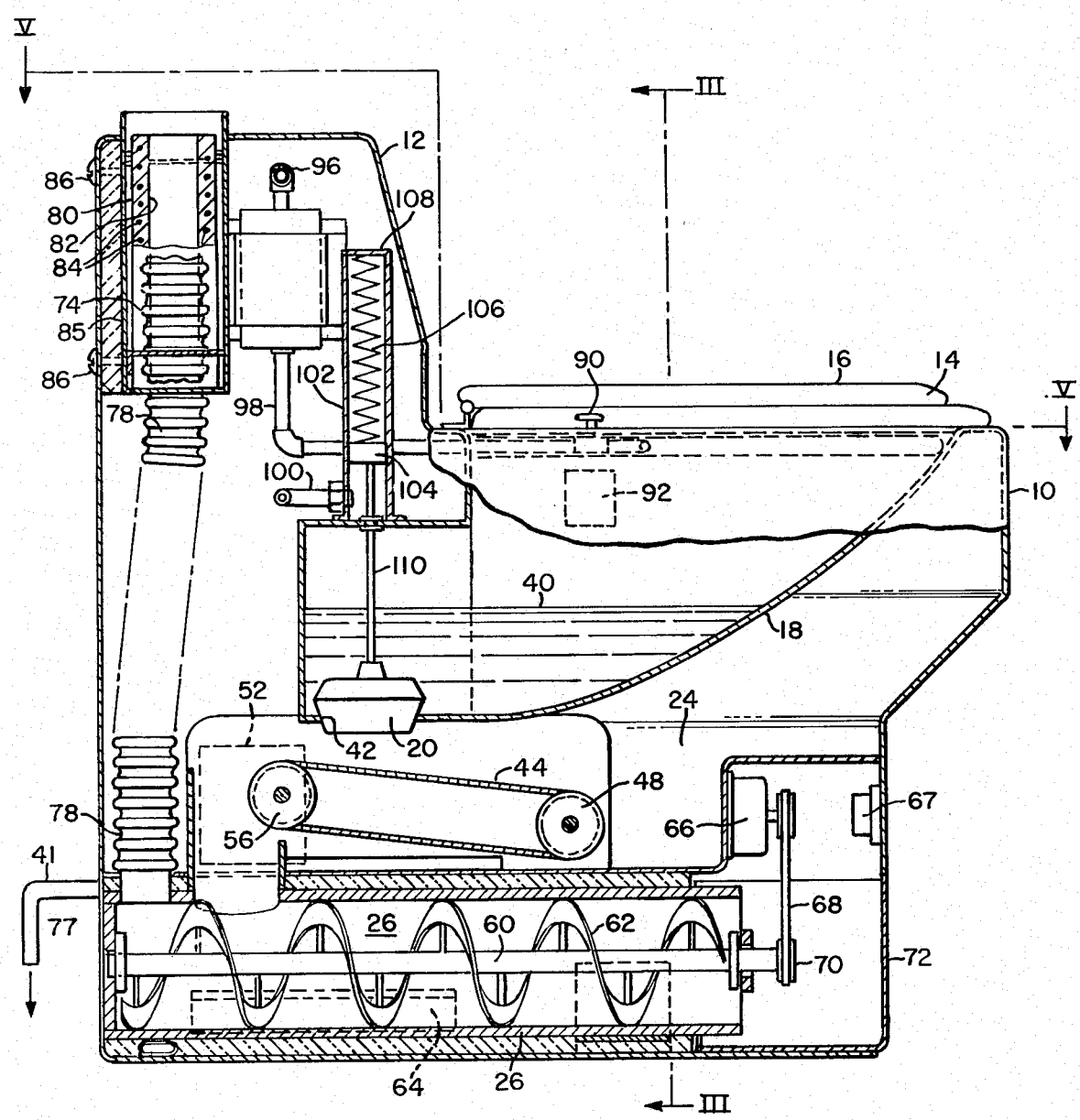
FIG. 4 is a side view of the apparatus shown in FIG. 3.
Figure 5:
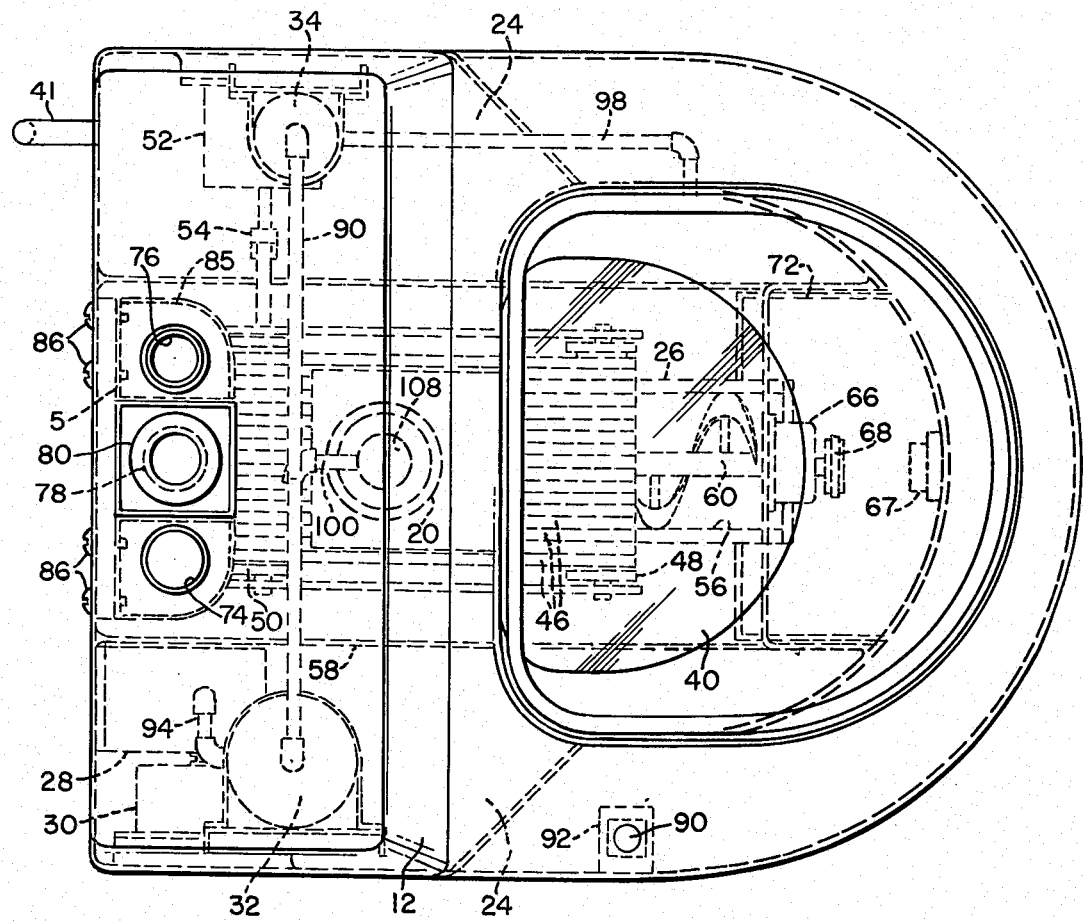
FIG. 5 is a plan view of FIG. 4.

Referring now to FIGS. 3–5 which illustrate the details of head construction, the housing 10 is made of plastic, stainless steel or other material and is arranged for bolting to the floor of a boat, trailer or the like. The housing is intentionally shaped to a configuration similar to domestic toilet designs without giving the appearance of a commercial waste treatment system. This is accomplished in an important way by sizing and positioning the operating components within the housing in a manner which permits performance of their intended functions without sacrificing component quality or reliability. As shown, liquid level 40 is maintained in the bowl as shown, except during a flusing period, as more fully described hereafter. As a protective measure, overflow pipe 41 may be installed on the housing 10. If necessary, the liquid level may be maintained by supplying water to, or pumping it from, the system through pipe 43. During normal operation, the amount of liquid input to the system balances the output which is dissipated by evaporation. Plug 20 selectively serves to open and close the bowl discharge opening 42.

As solid and liquid wastes are discharged through opening 42, the waste materials fall onto a wire belt 44 made of coiled springs 46 (FIG. 5) designed to hold and retain the solids while permitting liquid to flow between the wire springs into sump 24. The multiplicity of endless coiled springs 46 have the appearance of electrical resistance wire used for heating purposes. These springs extend over an idler roller 48 and roller 50 driven by motor 52 through a coupling 54. As shown more clearly in FIG. 4, the conveyor 44 is mounted at an angle to the horizontal to facilitate liquid drainage through the coil springs into the sump. The forward higher end of the belt conveyor is located over an opening 56 mounted in the upper portion of incinerator housing 58.

The incinerator is of the same design disclosed and claimed in applicant's copending application Ser. No. 221,991, filed Jan. 31, 1972, now U.S. Pat. No. 3,774,555 entitled Compact Incinerator and assigned to the same assignee as the present invention. As disclosed therein, the incinerator generally includes a shaft 60 having a helically formed metallic strip 62 extending around the shaft and along the shaft length. Heaters 64, FIG. 3, of the electrical resistance type extend along the incinerator length and when energized, transmits sufficient heat through the incinerator walls into the combustion space wherein the solid waste products are incinerated during their slow course of travel through the incinerator. In order to move such waste products from one end of the incinerator to the other, a motor 66 controlled by timer 67 mounted on an end of housing 10 is connected by means of a belt drive 68 to a coupling 70 mounted on the end of the incinerator shaft 60. It will be apparent that as the motor 66 is energized and belt 68 rotates shaft 60, solid waste products deposited in the incinerator will travel along the incinerator length by means of the helically shaped vanes 62. During the course of travel, complete combustion occurs and the ash residue remaining is then deposited in removable box 72 which may be emptied at any desirable time. The timer desirably should be set to burn the waste products once every 24 hours.

In order to provide air for combustion, a pair of flexible tubes 74 and 76, FIG. 3, are mounted in the top of back portion 12 and extend downwardly to terminate over opening 77 in the top wall 27 which serves to enclose the incinerator. An exhaust pipe 78 connected to the top wall 27 discharges hot combustion gases from the incinerator to the atmosphere. Since the exhaust pipe 78 extends upwardly through after burner 80, a draft created on the incinerator effectively purges the combustion chamber of combustion products and discharges them overboard or from the vehicular camper. The exhaust pipe 78 extends upwardly. The movement of air through tubes 74 and 76 and the discharge of combustion gases from the incinerator is made possible by locating the discharge end of exhaust pipe 78 in after burner 80. The after burner generally comprises a ceramic housing 82 of cylindrical configuration having electrical conductors 84 embedded in the ceramic walls which are spaced from metallic housing 85. As the conductors transmit heat to the ceramic housing and exhaust pipe 78, a draft created in the pipe 78, induces the flow of air into and through pipes 74 and 76 which not only provides air for combustion but also effectively purges the combustion chamber of combustion products and discharges them through pipe 78. Since both air inlet tubes 74 and 76 are disposed adjacent after burner 80 and the hot exhaust gas pipe 78, all of which are enclosed in housing 85, air flowing through tubes 74 and 76 is preheated on its path to the incinerator and effectively serves to increase the incinerator efficiency. The electrical conductors 84 are attached to terminals 86 which are embedded in a ceramic housing 88 used for electrical insulation purposes.

In lieu of utilizing the electrically powered incinerator described above, the invention includes within its scope the use of propane or other gas fired incinerators for consuming the waste products.

Electric incineration often offers greater benefits than those available from a propane or other gas fired incinerator. Where electrical power is available, electric incineration provides advantages in control, safety, compactness and reliability. Also, the power requirements are quite small.

When a waste treatment system of the type disclosed herein is operated on a boat having a four man crew, the average amount of liquid discharge to the system is 1.50 pounds per day. The energy required to evaporate this amount of water is about 1,500 BTU or 440 watt-hours. To burn all of the solids accumulated in a day would require 110 volts at 4 amperes for 1 hour; operating from a 12 volt system would therefore require 37 amperes. Standard automotive alternators fall within this power range. Economy and simplicity of system operation suggests electrical to be the best choice.

To flush the bowl 18 of water material, an electrical switch 90 conveniently mounted on the housing 10 is depressed to close a circuit to timer 92 which then energizes motor 30 for a predetermined time period as, for example, 30 seconds. As the motor starts, pump 28 draws its suction on liquid in the bottom of housing 10 and supplies it under pressure through pipe 94 to a filter 32. Any suspended solids in the liquid from base 10 are separated out in the filter 32 and the clear liquid is discharged through line 96 to the chlorinator 34. Upon passing over the tablets of calcium hypochlorite in the chlorinator, impurties are removed from the water and bacteria killed so that the resulting liquid product furnished to the bowl through pipe 98 is in a highly pure condition.

To remove plug 20 from the bottom of bowl 10, the liquid pumped upwardly through pipe 94 by pump 28 is caused to be partially diverted through pipe 100 which leads to the bottom of a cylinder 102 mounted immediately above the bowl 18. Cylinder 102 has a piston 104 vertically slidable therein, the piston being biased in a downward direction by a spring 106 held in the cylinder by a top plate 108. A shaft 110 interconnects the piston 104 with plug 20. It will be apparent that as pump 28 supplies liquid under pressure through pipe 94 upwardly, a portion will be diverted through pipe 100 into the cylinder 102. Upon entering the cylinder, the pressure will cause piston 104 to move upwardly as shown in FIG. 3, thus causing plug 20 to be removed from its opening and any waste and liquid in the base 10 will be discharged through opening 42 onto the spring belt 44. Since the timer 92 caused the motor 30 to be energized for approximately one-half minute, the pump 28 will continue pumping liquid from the sump through the filter and chlorinator and into the head bowl for this time period thus assuring complete flushing of the bowl surfaces. At the end of the half minute, motor 30 is deenergized by timer 92, pump 28 stops and the liquid remaining in the system flows by gravity into the bowl to fill it to a predetermined height while the liquid beneath the piston 104 reverses its flow and returns through pipe 94 and pump 28 back into the sump.

The filter 32 used in this invention is essentially the same as that disclosed and claimed in applicant's copending application Ser. No. 158,852, filed July 1, 1971, now U.S. Pat. No. 3,784,014 entitled Bimetallic Filter Media and assigned to the same assignee of the present invention. The filter material which consists of a mixture granular carbon and aluminum powder has been found to be very effective in removing contamination from the waste water. Essentially, the particles suspended in raw water and sewage, after primary treatment, are colloidal. Colloid particles with their large surfaces are likely to have ions attached to them, and since an ion induces a charge of opposite sign in an adjacent molecule, it will be held to the surface by the ion-induced dipole attraction. Accorrding to the simplest view, all of the particles in a given colloidal solution tend to absorb an excess of either positive or negative ions and thus acquire a charge. The particles thus repell each other and tend to prevent combination and precipitation of the colloidal material.

Aluminum ions added to the solutions passing through the filter coagulate colloid particles and react with OH-ions in the water to form $AL(OH)_3$ which yields alum floc which in turn aids in removing additional suspended as well as dissolved material. It will be understood that commercially available disposable filters also may be used, such as particulate filters made of felt or fabric depth. Paper cartridge filters and activated carbon filters may also be used for this purpose.

It is desirable that the flush pump be driven by an electrical motor with the motor matched to the available electric system. A one-sixth horsepower motor (125 watts) is adequate for pumping power. Assuming the waste treatment system to be installed in a vessel or vehicular camper which accommodates four people, for example, having a 12 volt battery power supply source, the pump will draw approximately 10.4 amperes. Although this amount of current could impose a considerable drain on the battery if it were continued for long periods of time, the flush pump operating time is in the order of 30 seconds for each flush and so the total ampere hour drain on the battery is small.

It will be apparent to those skilled in the art that a manual flush system is feasible using the waste treatment disclosed herein. A high volume diaphram bilge type pump can be used in lieu of the electrically driven pump illustrated and described. The screen and valve operators will be mechanically linked to the handle of the pump and sequencing and motivating power will be obtained from energy supplied to the pump.

In view of the above, it will be apparent that many modifications and variations are possible in light of the above teachings. It therefore is to be understood that within the scope of the appended claims the invention may be practiced other than as specifically described.

What is claimed as new is:

1. A compact waste treatment system comprising:
   a housing enclosing a bowl having a liquid therein adapted to receive solid-liquid waste materials;
   a valve positioned to open or close a discharge opening in the bottom of said bowl, and selectively operable control means connected to control operation of said valve;
   solid-liquid separation means mounted in said housing below said opening and in a position to receive the solid-liquid waste materials upon actuation of said valve to an open position;
   incineration means enclosed in a container in said housing, said container having an inlet positioned to receive the solids in the waste materials which are separated from the liquid by the solids-liquid separation means;

said incineration means including a device for moving said solids therethrough, and heating means in said incineration means of sufficient capacity to completely incinerate said solids and thus form an ash residue;

an ash residue outlet in said container, and removable disposal means in said housing adjacent said container outlet for receiving the ash residue from the incineration means;

a sump in the base of said housing which receives liquid from the solid-liquid separation means;

a motor driven pump responsive to said control means, said pump having an inlet connected to the sump and an outlet connected to liquid conditioning means which removes suspended solids and purifies said liquid; and means connecting said liquid conditioning means with said bowl for furnishing the purified liquid thereto for bowl flushing and cleaning purposes.

2. The waste treatment system according to claim 1 wherein said control means includes a timer connected to the pump motor for operating the pump for a time period sufficient to effect flushing and cleansing of said bowl.

3. The waste treatment system according to claim 2 wherein a second timer further is connected separately to said heating means and to an incinerator motor, means connecting the incinerator motor with a conveyor in the incinerator which moves solid waste products along the incinerator length so that when the second timer energizes the heating means and incinerator motor, solid waste products moved along the incinerator length are reduced to an ash residue.

4. The waste treatment system according to claim 2 wherein the pump outlet is connected to a valve actuating device, and means connecting the device with said valve;

whereby liquid discharged from said pump causes the valve actuating device to open said valve and permit waste materials to be discharged from the bowl, while simultaneously causing liquid flow from the sump through the liquid conditioning means to the bowl for bowl flushing purposes.

5. The waste treatment system according to claim 1 wherein said control means includes an actuating device attached to the valve which selectively removes and replaces said valve in the opening in response to operation of said control means;

said actuating device comprising a cylinder, a piston in said cylinder connected to said valve, and means biasing said valve to a closed position; and means connecting the pump outlet with the bottom of said cylinder so that when the control means starts the pump motor, liquid from the sump is pumped in parallel to the liquid conditioning means and the cylinder thereby respectively furnishing purified liquid to the bowl and raising said valve out of said bowl opening.

6. A waste water treatment system according to claim 1 wherein said solid-liquid separation means comprises a pair of spaced rotating members having an endless belt thereon, said elements and the belt being spaced a distance sufficient to permit liquid to flow therethrough while still retaining solids which are discharged to the incinerator.

7. The waste treatment system according to claim 1 wherein at least one air inlet pipe supported in said housing has an inlet communicating with the atmosphere and the outlet connected to the incineration means for supplying air thereto, the air being effective in facilitating reduction of the solids to an ash residue; and an exhaust pipe in said housing having one end connected to said incineration means and the other end to the upper part of the housing for carrying away the gaseous products of combustion from the incineration means and providing for discharge of such combustion products to the atmosphere.

8. The waste treatment system according to claim 7 wherein an after burner mounted on said housing surrounds the discharge end of the exhaust pipe, and heating means in said after burner for imparting heat to the gaseous products of combustion prior to their discharge to the atmosphere; and means attaching said air inlet pipe in heat exchange relationship with said after burner for imparting heat to air being supplied to the incineration means for increasing its efficiency.

* * * * *